United States Patent [19]

Smith et al.

[11] 4,113,791
[45] Sep. 12, 1978

[54] FLUID SOLVENTLESS EPOXY-ANHYDRIDE COMPOSITIONS CONTAINING METAL ACETYLACETONATE ACCELERATORS AND ORGANIC CARBOXYLIC ACID CO-ACCELERATORS

[75] Inventors: James D. B. Smith, Wilkins Township, Allegheny County; Robert N. Kauffman, Monroeville, both of Pa.

[73] Assignee: Westinghouse Electric Corp., Pittsburgh, Pa.

[21] Appl. No.: 773,875

[22] Filed: Mar. 3, 1977

[51] Int. Cl.² .................................... C08L 63/00
[52] U.S. Cl. .................... 260/830 TW; 260/18 PF; 260/37 EP; 336/96; 427/185; 428/418; 528/92; 528/103; 528/361; 528/365

[58] Field of Search ................ 260/830 TW, 78.4 EP, 260/2EA, 2 EC, 47 EA, 47 EC, 37 EP

[56] References Cited

U.S. PATENT DOCUMENTS 3,624,032 11/1971 Miyashiro et al. ............... 260/47 EC
3,956,241 5/1976 Steele et al. ..................... 260/47 EC Primary Examiner—Theodore E. Pertilla
Attorney, Agent, or Firm—D. P. Cillo

[57] ABSTRACT

A resinous composition, suitable as a high voltage insulation for electrical members, is made from an admixture containing: 100 parts of an epoxy resin, about 25 to 200 parts of an acid anhydride reactive with the epoxy resin, about 0.01 to 2.0 parts of chromium or zirconium acetylacetonate, acting as a latent accelerator and about 0.3 to 30 parts of a selected organic carboxylic acid, acting as a co-accelerator.

8 Claims, 5 Drawing Figures

FLUID SOLVENTLESS EPOXY-ANHYDRIDE COMPOSITIONS CONTAINING METAL ACETYLACETONATE ACCELERATORS AND ORGANIC CARBOXYLIC ACID CO-ACCELERATORS

BACKGROUND OF THE INVENTION

To improve high temperature stability, and to give better physical and electrical properties over amine cured epoxy resin systems, it has been the general practice in the epoxy technological field to use anhydride curing agents with epoxy resins, particularly for high voltage insulation applications. Most epoxy-anhydride formulations require elevated-temperature cures, and for most commercial applications it is necessary to add some material to speed the rate of cure. Consequently, a considerable amount of effort has been devoted in recent years to develop a perfect catalyst or accelerator for curing eposy resins, especially those used for high voltage coil insulation, i.e., over about 7,000 volts. In high voltage coils, only an absolute minimum of voids can be tolerated in the resinous insulation. Therefore, the applied resin impregnating composition must be extremely fluid, solventless, and capable of a very fast gel, so that resin will not easily drain from a coil The properties desired of such a catalyst or accelerator are: it should be inexpensive and readily available; it should gel the epoxy resin system at times below 60 minutes, and preferably below 50 minutes, at about 150° C.; it should be completely soluble with the epoxy resin-anhydride system at all temperatures; the initial viscosity of the catalyzed resin system should be below about 350 cps. at 25° C.; the storage life of the catalyzed resin system should be over at least 60 days, and preferably about 120 days at 25° C., i.e., the viscosity should remain below about 1,000 cps. during that period; it should not adversely affect the mechanical properties of the cured resin system; after cure, the resin system should have power factor values of below about 10% at 150° C.

Several latent catalysts have appeared on the commercial scene in recent years. Included are quaternary ammonium halides such as benzyltrimethyl-ammonium chloride, stannous octoate, "extra-coordinate" siliconate salts, triethanolamine borate, triethanolamine titanate and various other metal chelates. However, all of these materials failed to meet all of the above described requirements and have been rejected.

Mylashiro, in U.S. Pat. No. 3,624,032, taught catalytic cures of solid, particulate, epoxy-anhydride transfer molding compositions, by using 0.1 to 10 parts/100 parts epoxy of a zinc, iron, aluminum, copper, cobalt, nickel, magnesium, zirconium or tin acetylacetonate catalytic hardener.

Markovitz, in U.S. Pat. No. 3,812,214, taught catalytic cures of relatively viscous, epoxy resin systems, having initial viscosities of about 375 cps. to 1,200 cps. at 25° C., by using up to 20 wt.% of a combination phenolic resin accelerator - metal acetylacetonate catalytic hardener. Markovitz eliminated anhydride curing agents, and substituted phenolic resin accelerators and the use of up to 5 wt.% of metallic acetylacetonates. The useful acetylacetonates could contain essentially any metal anion.

Smith, in U.S. Pat. No. 4,026,862, taught the use of amines, imidazoles and quaternary organic onium salts as latent catalysts, for a solventless, highly fluid, resinous, epoxyanhydride impregnating composition, having a mono-carboxylic acid storage stabilizer. British Pat. No. 1,428,561, taught the use of activated chromium-2-ethyl hexanoate as catalyst, and quaternary phosphonium halides or tertiary amines as cocatalysts to provide rapid room temperature gellation for a liquid epoxy-anhydride potting resin system.

Meyers, in U.S. Pat. No. 3,678,004, taught catalytic cures of fluid, epoxy-solvent, non-anhydride systems, using aluminum acetylacetonate as a catalytic hardener, and mineral inorganic, carboxylic, halogenated carboxylic, hydroxyl substituted carboxylic or aryl sulfonic acids as storage stabilizers.

Epoxy-anhydride systems are still very useful. What is needed is an improved epoxy resin system, which still contains anhydride curing agents, but which will have good pot life, and improved gel times and electrical properties. The epoxy-anhydride system should be very fluid, i.e., initially below about 350 cps. at 25° C., to ensure its usefulness as an impregnating composition for high voltage applications, where complete coil impregnation is critical.

SUMMARY OF THE INVENTION

It has been discovered that selected organic carboxylic acids are effective as co-accelerators for epoxy resins, cured with chromium or zirconium acetylacetonate latent accelerators, when used in certain weight proportions with an acid anhydride reactive with the epoxy resin. The effective weight ratio of epoxy resin:acid anhydride:chromium or zirconium acetylacetonate:selected carboxylic acid coaccelerator is 100:25 to 200:0.01 to 2.0:0.3 to 30. Preferably the resin will consist of a low viscosity epoxy:high viscosity epoxy mixture having a weight ratio of from about 1.0:0.0 to about 1.0:9.0.

The useful carboxylic acid co-accelerators are selected from the group consisting of acetic acid, propionic acid, butyric acid, isobutyric acid, valeric acid, caproic acid, heptanoic acid, caprylic acid, benzoic acid, toluic acids, chlorobenzoic acids, nitrobenzoic acids, succinic acid, glutaric acid, adipic acid, pimelic acid, suberic acid, azelaic acid, sebacic acid, phthalic acid, isophthalic acid and terephthalic acid, and their mixtures.

Unexpectedly, these carboxylic acids decrease the gel time, rather than acting as a storage stabilizer, when chromium acetylacetonate or zirconium acetylacetonate is used as the latent catalyst. These particular combinations of accelerators will initiate an extremely fast latent acceleration phenomenon. This combination of ingredients provides an impregnating and casting composition having an initial viscosity of up to about 350 cps. at 25° C.

Excellent storage properties at ambient temperatures have also been found, i.e., storage lifetimes of at least 60 days up to 1,000 cps. at 25° C.; consequently, long life resin formulations employing the latent accelerator and carboxylic acid co-accelerator combinations are possible. Electrical measurements on the cured system show very low dielectric constants and power factor values even at temperatures up to 150° C. These epoxy-anhydride compositions can be applied to and easily impregnate electrical coil windings used in insulated high voltage electrical motors, and generators, particularly those having mica wrapped ground walls and multiple layers of mica insulation. They are also a useful potting or casting compound for transformers and may also find use as coating powders for spray or fluid bed applications.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
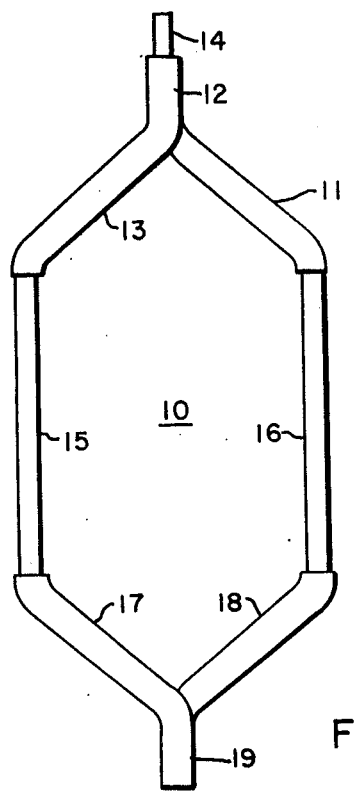
FIG. 1 is a plan view of a closed full electrical coil member having two slot portions.

It has been found that chromium acetylacetonates and zirconium acetylacetonates are particularly effective latent accelerators, for the anhydride cure of epoxy coating compositions used in impregnating and encapsulating the coils of high voltage capability electrical devices, when used in conjunction with selected organic carboxylic acids, acting as co-accelerators. At concentrations of about 0.01 to 2.0 parts latent accelerator and about 0.3 to 30 parts selected carboxylic acid, per 100 parts epoxy resin, rapid and improved gel times in the temperature range of 125° C. to 175° C. are possible.

The term "latent accelerator" is taken to mean the ability of certain compounds to speed up curing rates of epoxy-anhydride systems at elevated temperatures (e.g. over 100° C.) while exhibiting little or no cure at room temperature, thus giving good storage properties. Chromium or zirconium acetylacetonate, the latent accelerators used in the present invention, can be characterized by the following structural formula:

$$Cr^{3+}(C_5H_7O_2)_3 \text{ and } Zr^{4+}(C_5H_7O_2)_4$$

They can be used alone or in mixtures. A great number of metal acetylacetonates do not show gel time improvement when used with carboxylic acids. Included among the metal acetylacetonates which do not benefit from this carboxylic co-acceleration, are cobalt (II) acetylacetonate, cobalt (III) acetylacetonate, and manganese (III) acetylacetonate.

At this time it is not clear why only certain of the metal acetylacetonates are such effective latent accelerators for epoxy-anhydride impregnating systems. It is believed that after several days a complex or adduct forms between the anhydride and the chromium or zirzonium compound to open the anhydride ring, producing a heat activated ionic species especially free to react with the epoxy. The reason why only selected metal acetylacetonates are useful with anhydride type systems may also be due in part to some type of metal acetylacetonate anhydride complex or adduct formation. It is believed that the cure mechanism is not a catalytic cure, but rather a type of metal acetylacetonate·epoxy or anhydride adduct formation, followed by proton transfer from the adduct to other epoxy or anhydride molecules.

The materials which were found useful as chemical co-accelerators, to substantially decrease gel time of the epoxy-anhydride-chromium or zirconium acetylacetonate system, are certain carboxylic acids, when added within a critical epoxy:anhydride:chromium or zirconium acetylacetonate: organic carboxylic acid weight percent ratio. The organic carboxylic acids useful in this invention contain one or two carboxyl groups

attached to an aliphatic alkyl or aromatic group.

The aliphatic mono-carboxylic acids which are effective to increase the reaction rate of epoxy-anhydridelatent catalyst systems are acetic acid ($CH_3COOH$), propionic acid ($CH_3CH_2COOH$), butyric acid ($CH_3CH_2CH_2COOH$), isobutyric acid

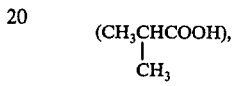

valeric acid ($CH_3(CH_2)_3COOH$), caproic acid ($CH_3(CH_2)_4COOH$), heptanoic acid (enanthic acid ($CH_3(CH_2)_5COOH$, and caprylic acid (hexanoic acid ($CH_3(CH_2)_6COOH$). The useful aromatic mono-carboxylic acids are benzoic acid ($C_6H_5COOH$), toluic acids (ortho, meta and para $CH_3C_6H_4COOH$), chlorobenzoic acids (ortho, meta and para $ClC_6H_4COOH$), and nitrobenzoic acids (ortho, meta and para $O_2NC_6H_4COOH$). Useful aliphatic dicarboxylic acids are succinic acid ($HOOC(CH_2)_2COOH$), glutaric acid ($HOOC(CH_2)_3COOH$), adipic acid ($HOOC(CH_2)_4COOH$), pimelic acid ($HOOC(CH_2)_5COOH$), suberic acid ($HOOC(CH_2)_6COOH$), azelaic acid ($HOOC(CH_2)_7COOH$) and sebacic acid ($HOOC(CH_2)_8COOH$). Useful aromatic dicarboxylic acids are phthalic acid (ortho $C_6H_4(COOH)_2$), isophthalic acid (meta $C_6H_4(COOH)_2$) and terephthalic acid (para $C_6H_4(COOH)_2$). These selected organic carboxylic acids can be used alone or in mixtures. Acetic acid is preferred. These selected acids decrease the gel time of epoxyanhydride-chromium or zirconium acetylacetonate systems from about 22% to 30%, and do not harm either the storage stability or electrical properties of the system.

The useful, selected carboxylic acids must be mixed in critical proportions with the epoxy-anhydride-chromium or zirconium acetylacetonate system. The useful weight percent range of ingredients, to provide a good compromise of fluidity, cure time, fast gel, storage life and electrical and mechanical properties is an epoxy: anhydride:chromium or zirconium acetylacetonate:carboxylic acid weight ratio of 100:25 to 200:0.01 to 2.0:0.3 to 30, with a preferred weight ratio of 100:75 to 150:0.02 to 1.0:0.4 to 20. Over 30 parts of selected carboxylic acid per 100 parts of epoxy causes precipitation, loss of fluidity and reduction of pot life; under 0.3 part of selected carboxylic acid does not improve gel times.

The mechanism for the co-accelerating effect of these selected organic carboxylic acids with only chromium or zirconium acetylacetonate latent accelerators is not completely understood. The mechanism is believed to involve partial ligand displacement or rearrangement of the acetylacetonate compound by interaction with a carboxylic acid molecule (or molecules) to form a new catalytic species.

One type of epoxy resin, which may be used in the invention, is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

where $n$ is an integer of the series 0, 1, 2, 3 . . ., and R represents the divalent hydrocarbon radical of the dihydric phenol. Typically R is:

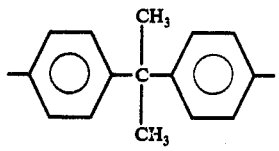

to provide a diglycidyl ether of bisphenol A type epoxide or

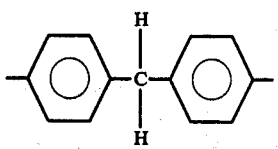

to provide a diglycidyl ether of bisphenol F type epoxide resin.

The bisphenol epoxides used in the invention have a 1, 2 epoxy equivalency greater than one. They will generally be diepoxides. By the epoxy equivalency, reference is made to the average number of 1, 2 epoxy groups,

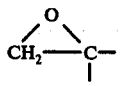

contained in the average molecule of the glycidyl ether. Typically, epoxy resins of bisphenol are readily available in commercial quantities and reference may be made to *The Handbook of Epoxy Resins*, by Lee and Neville for a complete description of their synthesis.

Other glycidyl ether resins that are useful in this invention include polyglycidyl ethers of a novolac. The polyglycidyl ethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

The product of the reaction is generally a massive oxidation resistant aromatic compound, one example of which is representd by the chemical structural formula:

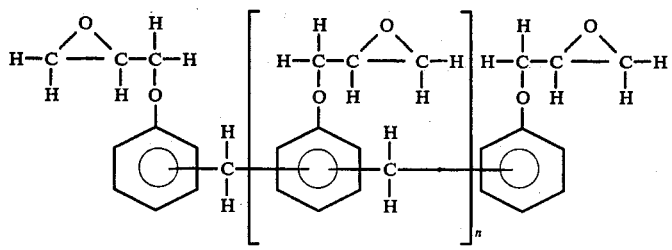

wherein $n$ is an integer of the series 0, 1, 2, 3, etc.

Although epoxy novolac resins from formaldehyde are generally preferred for use in this invention, epoxy novolac resins from any other aldehyde such as, for example, acetaldehyde, chloraldehyde, butylaldehyde, fufuraldehyde, can also be used. Although the above formula shows a completely epoxidized novolac, other epoxy novolacs which are only partially epoxidized can be useful in this invention. An example of a suitable epoxy novolac is 2, 2, bis [p-(2,3-epoxypropoxy)-phenyl]-methane. These resins are well known in the art and reference may be made to *The Handbook of Epoxy Resins* for a complete description of their synthesis. Other useful epoxy resins include glycidyl esters, hydantoin epoxy resins, cycloaliphatic epoxy resins and diglycidyl ethers of aliphatic diols.

The glycidyl ester epoxy resins which can be employed in this invention are non-glycidyl ether epoxides containing more than one 1,2 epoxy group per molecule. They are characterized by substitution of the ester bond,

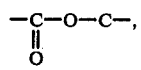

for the ether bond, —O—, and have the chemical structural formula:

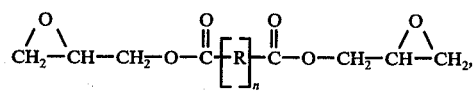

where R is an organic radical substituent selected from the group consisting of R', R'—O—R', R'—COO—R' and mixtures thereof, where R' is selected from the group consisting of alkylene groups, having from about 1-8 carbon atoms, saturated cycloalkylene groups where the ring has 4 to 7 carbons and mixtures thereof, where n is from about 1-8.

The hydantoin epoxy resins which can be employed in this invention are based on hydantoin, a nitrogen-containing heterocyclic ring having the structure:

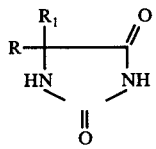

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together for form extended resins analogous in structure to bisphenol A. Polyfunctional resins can also be formed from these chainextended materials by glycidylization of the hydroxyls and the remaining nitrogens. These heterocyclic glycidyl amine epoxy resins can be represented by the structural formula:

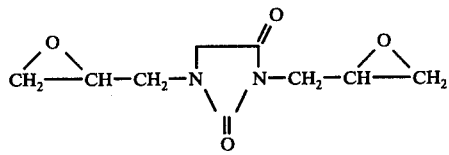

The cycloaliphatic type epoxides employed as the resin ingredient in the invention are selected from non-glycidyl ether epoxides containing more than one 1,2 epoxy group per molecule. These are generally prepared by epoxidizing unsaturated aromatic hydrocarbon compounds, such as cyclo-olefins, using hydrogen perioxide or peracids such as peracetic acid and perbenzoic acid. The organic peracids are generally prepared by reacting hydrogen peroxide with either carboxylic acids, acid chlorides or ketones to give the compound R-COOOH. These resins are well known in the art and reference may be made to Brydson, J., *Plastic Materials,* 1966, 471, for their synthesis and description.

Such non-glycidyl ether cycloaliphatic epoxides are here characterized by the absence of the ether oxygen bond, i.e., —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. The term "epoxide" as herein used is equivalent to the term "epoxy resin".

Examples of non-glycidyl ether cycloaliphatic epoxides would include 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); 3,4-epoxy - 6 - methylcyclohexyl methyl - 3,4-epoxy - 6 - methylcyclohexene carboxylate and dicyclopentadiene, having the following respective structures:

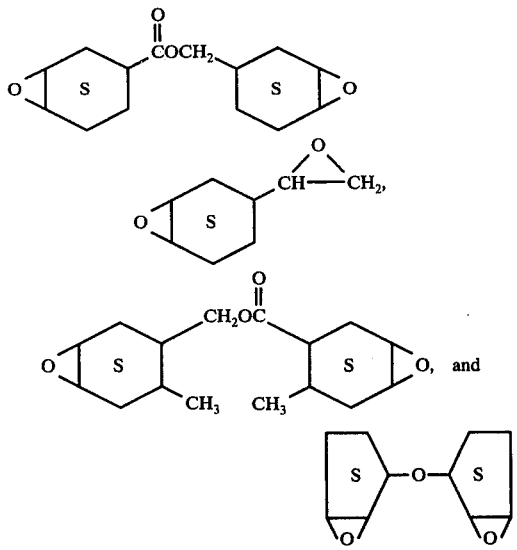

A distinguishing feature of many of the nonglycidyl ether cycloaliphatic epoxides is the location of the epoxy group(s) on a ring structure rather than on an aliphatic side chain. Generally, the cycloaliphatic epoxide particularly useful in this invention will have the formula selected from the group of:

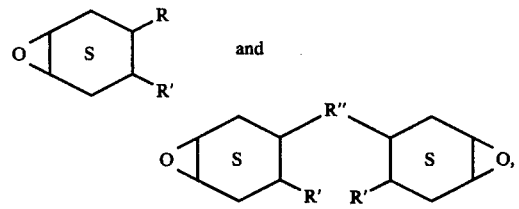

where S stands for a saturated ring structure, R is selected from the group consisting of $CHOCH_2$, $O(CH_2)_nCHOCH_2$ and $OC(CH_3)_2CHOCH_2$ radicals where $n = 1$ to 5, R' is selected from the group consisting of hydrogen, methyl, ethyl, propyl, butyl and benzyl radicals and R" is selected from the group consisting of $CH_2OOC$, and $CH_2OOC(CH_2)_4COO$ radicals.

Other useful epoxy resins include diglycidyl ethers of an aliphatic diol having from 2 to 12 carbon atoms. These are low viscosity epoxy resins, usually monomers. Included are diglycidyl ethers of a glycol having from 2 to 12 carbon atoms between the glycidyl ether units, i.e., 2 to 12 carbons in the glycol unit, for example, diglycidyl ether of neopentyl glycol (DGENPG), diglycidyl ethers of 1,4 butane diol, diglycidyl ethers of ethylene glycol, and diglycidyl ethers of polyether glycols, such as, for example, diglycidyl ethers of triethylene glycol and diglycidyl ethers of tetraethylene glycol and their mixtures.

DGENPG is the preferred epoxy resin of this type. DGENPG is prepared by a two step process. The initial step reacts neopentyl glycol and epicholorohydrin in the presence of $BF_3$ to produce a chlorohydrid intermediate which is then dehydrohalogenated by sodium hydroxide or sodium aluminate to provide:

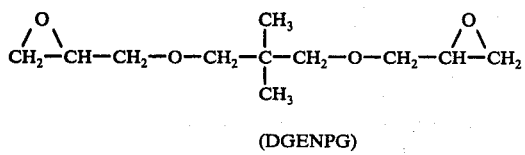

(DGENPG)

The use of diglycidyl ethers of an aliphatic diol as the only epoxy resin component provides resinous compositions having only about 15 cps. to 30 cps. initial viscosities at 25° C. They are extremely useful for very high voltage applications, i.e., about 20,000 to 30,000 volts, where thick multiple layers of mica insulation must be impregnated.

It is preferred to use some of these diglycidyl ethers of aliphatic diols in combination with the other epoxy resins, because the aliphatic diol epoxides are all low viscosity materials, generally between about 5 cps. to 60 cps. at 25° C., and help to reduce the viscosity of the resin impregnation composition. The epoxy resin system can consist of: (A) a first epoxy resin having a low viscosity (between about 5 to about 60 cps. at 25° C.) i.e., diglycidyl ethers of aliphatic diols and (B) another or second epoxy resin that has a high viscosity (above about 250 cps. and generally between about 250 cps. to about 20,000 cps. at 25° C.) i.e., bisphenol A, bisphenol F, novolacs, glycidyl esters, hydantoins, cycloaliphatics and their mixtures; in the weight ratio of diglycidyl ether of an aliphatic diol low viscosity epoxy resin:- second epoxy resin having a high viscosity of from about 1.0:0.0 to about 1.0:9.0. The preferred range for most applications will be a range of low viscosity epoxy resin:high viscosity epoxy resin of from about 1.0:0.75 to about 1.0:4.0.

All of these epoxy resins can be characterized by reference to their epoxy equivalent weight, which is defined as the mean molecular weight of the particular resin divided by the mean number of epoxy radicals per molecule. In the present invention, all of the suitable epoxy resins will have a preferred epoxy equivalent weight of from about 100 to about 500 with a most preferred range of about 150 to about 250.

The organic, carboxylic acid anhydrides reactive with the epoxy, which are to be used in carrying out the invention, include the conventional organic mono- and polyfunctional anhydrides. Typical of the mono-functional anhydrides are hexahydrophthalic anhyride, 1-methylhexahydrophthalic anhydride, tetrahydrophthalic anhydride, 1-methyltetrahydrophthalic anhydride, phthalic anhydride, NADIC anhydride, NADIC methylanhydride, dodecenyl succinic anhydride and the like. Poly-functional anhydrides which may be employed include pyromellitic dianhydride, polyazelaic polyanhydride, the reaction product of trimellitic anhydride and a glycol, and benzophenone tetracarboxylic acid dianhydride. These organic anhydrides may be used singly or in admixture. The total anhydride content of the epoxy-anhydride mixture must lie within the range of from about 0.5 to about 1.5 anhydride equivalents for each epoxy equivalent.

For a number of special purposes unmodified epoxy resins may be considered to have certain disadvantages. These disadvantages may include high cost and too great a rigidity for specific applications. The epoxy resins may be modified by incorporation of epoxide diluents, flexibilizers and fillers. Effective amounts of a reactive epoxide diluent may be employed, generally between about 10 parts to 25 parts per 100 parts of the epoxy resins enumerated above, to further help reduce the viscosity of the mixed system. Diluents such as, for example, phenyl glycidyl ether, butylglycidyl ether, alkyl glycidyl ether, vinyl cyclohexanone dioxide, endo-dicyclopentadione dioxide, octylene oxide and their mixtures, can be used.

Epoxidized natural oil extenders, such as epoxidized linseed or soy bean oils, octyl epoxy tallate and reactive plasticizers such as the conventional phthalates and phosphates may also be used in small amounts, up to about 40 parts per 100 parts of epoxy resin to provide increased flexibility. Thixotropic agents, such as $SiO_2$ and asbestos in gel composition, and pigments such as $TiO_2$ may be used as aids in fluidizing the composition or enhancing the color tones of the cured resins. Similarly, various inorganic particulate fillers, such as silica, quartz, beryllium aluminum silicate, lithium aluminum silicate and mixtures thereof, in average particle sizes of from about 10 to 300 microns, may be employed in amounts up to about 100 parts per 100 parts of epoxy resin, to improve electrical properties of the resin formulation.

A closed full coil 10, prepared in accordance with the present invention, for insertion into the slots in an insulated high voltage electrical machine, such as an insulated high voltage electric motor or generator, is illustrated in FIG. 1. The full coil would be disposed within the slots of the stator surrounding the metal motor armature or generator rotor. The full coil comprises an end portion comprising a tangent 11, a connecting loop 12 and another tangent 13 with bare leads 14 extending therefrom. Slot portions 15 and 16 of the coil which sometimes are hot pressed to precure the resin and to form them to predetermined shape and size are connected to the tangents 11 and 13, respectively. These slot portions are connected to other tangents 17 and 18 connected through another loop 19. In general, generator coils are impregnated and then hot pressed prior to winding; motor coils are generally post impregnated "in situ".

The coils are placed in the slots of the stator of an electrical apparatus and the end windings wrapped and tied together. The uninsulated leads are then soldered, welded or otherwise connected to each other or to the commutator. Somewhat similar coils can also be used in the slots of the metal motor armature and the metal generator rotor of an electrical apparatus. In the case of a motor, generally the entire motor containing the coils will be placed in an impregnating bath containing the impregnating resin of this invention and vacuum impregnated. Thereafter the impregnated motor is removed from the impregnating tank, drained, placed in an oven and heated to a temperature to cure the completely reactive composition in the coils.

Figure 2:
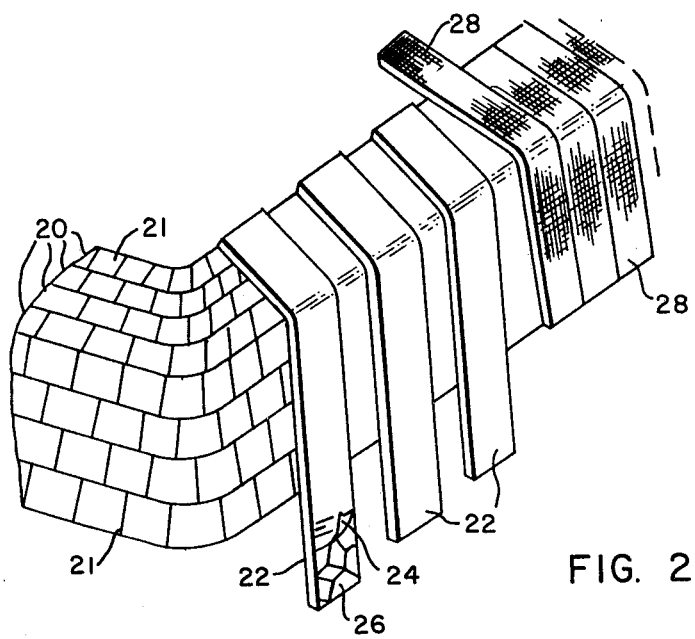
FIG. 2 is a fragmentary view in perspective, showing part of a high voltage coil comprising a plurality of turns of conductors wound with turn insulation and bound together with mica tape as ground insulation, covered with a porous outer binding tape.

In a high voltage motor, generator or transformer, the coil member may comprise a plurality of turns of round or rectangular metallic, electrical conductors, each turn of the conductor consisting essentially of a copper or aluminum strap 20 wrapped with turn insulation 21, as shown in FIG. 2. The turn insulation 21 would be disposed between the conductor straps 30 and the mica tape 22, and would generally be prepared from a fibrous sheet or strip impregnated with a resinous insulation.

While the turn insulation may consist solely of a coating of uncured varnish or resin, it can also comprise a wrapping of fibrous material treated with a cured resin.

Glass fiber cloth, asbestos paper or mica paper treated with a cured resin may be used with equally satisfactory results. The resin applied to the turn insulations may be a phenolic resin, an alkyd resin, a melamine resin or the like.

The turn insulation is generally not adequate to withstand the severe voltage gradients that will be present between the conductor and ground when the coil is installed. Therefore, ground insulation for the coil is provided by mica tape 22, which wrap around the entire coil of electrical conductors. Preferably, a plurality of layers of composite mica tape 22, which may comprise mica paper or mica flakes 26 bound to a flexible material 24 by a resin, are wrapped about the coil to bind the electrical conductors together, with sixteen or more layers being used for high voltage coils of generators.

The resin binding the mica paper or mica flakes can comprise cured or uncured epoxy resin, polyester resin, acrylic resin, or preferably a substantially unreacted epoxy resin containing an effective amount of compatible catalyst. An outer tape 28, which is porous may be wound around the mica tape bound coil. The outer tape may comprise a porous, open weave substrate of natural or synthetic fabric cloth, for example, cotton, polyethylene or polyethylene terephthalate, coated with a phenolic type resin.

The highly fluid resin of this invention is used to impregnate and coat the outer tape and mica tape shown. The highly fluid resin of this invention may also be used to coat and completely impregnate a transformer having a magnetic core and electrical windings disposed about the core.

Figure 3:
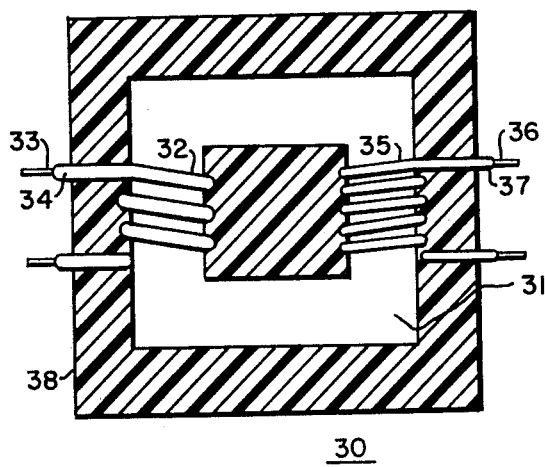
FIG. 3 is a vertical section through a transformer.
Figure 4:
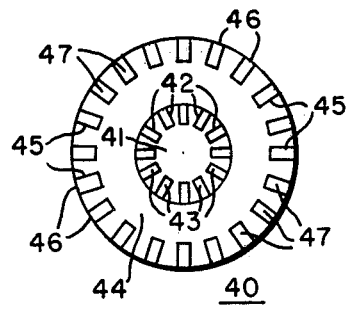
FIG. 4 is a vertical section through a motor.
Figure 5:
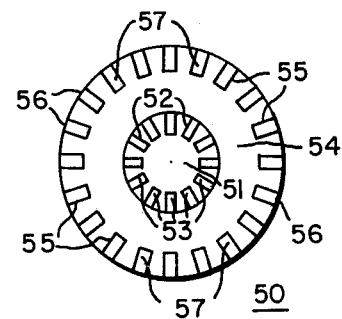
FIG. 5 is vertical section through a generator.

By way of illustration, FIG. 3 shows one embodiment of a transformer 30 in cross section. The transformer comprises a magnetic core 31 provided with one winding 32, which comprises an electrical conductor 33 insulated with insulation 34 and another winding 35, which comprises an insulated conductor 36 also insulated with insulation 37. The magnetic core with its associated windings disposed about the core may be potted with insulation 38. All of the insulation can comprise the cured resinous compositions of this invention. FIG. 4 shows one embodiment of a motor 40 in cross section. The motor comprises a metal armature 41 having slots 42 therein, containing insulated coils 43, surrounded by a metal stator 44 having slots 45 therein about the stator circumference at 46. The stator slots contain insulated coils 47. All of the insulation on the coils 43 and 47 can comprise the cured resinous compositions of this invention. FIG. 5 shows one embodiment of a generator 50 in cross section. The generator comprises a metal rotor 51 having slots 55 therein, containing insulated coils 53, surrounded by a metal stator 54 having slots 55 therein about the stator circumference at 56. The stator slots contain insulated coils 57 and may also contain inner cooling channels not shown. All of the insulation on the coils 53 and 57 can comprise the cured resinous compositions of this invention.

EXAMPLE 1

Resin samples were made containing 50 grams of a liquid diglycidyl ether of bisphenol A epoxy resin, having an epoxy equivalent weight of 172 to 176 and a viscosity at 25° C. of 4,000 to 5,550 cps. (sold commercially by Dow Chemical Co. under the tradename DER-332), 50 grams of neopentyl diglycidyl ether epoxy resin (diglycidyl ether of neopentyl glycol (DGENGP) having an epoxy equivalent weight of 130 to 165 and a viscosity at 25° C. of 6 to 8 cps. (sold commercially by Ciba Geigy Co.), 105 grams of 1-methyltetrahydrophthalic anhydride, 0.05 gram of chromium (III) acetylacetonate as latent accelerator and 6 parts of selected carboxylic acids, acting as co-accelerators. Samples of lactic acid (alphahydroxy propionic carboxylic acid $CH_3CHOHCOOH$), trifluoroacetic carboxylic acid ($F_3C-COOH$), benzene sulfonic acid, and catechol (phenolic additive) were included as comparative samples. One sample did not contain any carboxylic acid and acted as a control. This provided an epoxy resin: acid anhydride:chromium acetylacetonate:selected carboxylic acid weight ratio of 100:105:0.05:0 to 6.

The components were poured into a container, stirred at room temperature and then put in a paint mixer for about five minutes. The initial viscosity of the samples was about 100 cps. to 120 cps. at 25° C.. After about 4 hours, 20 gram samples were poured into flat 2 inch diameter aluminum dishes covered with a clock glass. These samples were placed in a 150° C. forced air oven. Each sample was inspected every 10 to 20 minutes to record the gel time. The approximate gel time was considered to be the amount of time it took the formulation to start to solidify.

Storage properties of the formulation were found by measuring viscosities at 25° C. in Gardner-Holdt bubble tube (ASTM designation D154-56). Measurements were usually taken at one-week intervals. The termination of the storage lifetime (pot-life) of these formulations was considered to be when the viscosity reached a value of 1,000 cps. at 25° C.. Over about 1,000 cps. it would be difficult to completely impregnate high voltage coils and substantial voids may occur.

To evaluate the effect of the accelerators on the electrical properties of the cured resin, 2 inch diameter × ⅛ inch. to ¼ inch thick castings were cured in an oven using a heating cycle of 16 hours at 150° C., and 60 Hz power factors (100 × tan δ) and dielectric constant values ε' were obtained at 150° C. (ASTM designation D150-65T). The results of these tests are recorded in Table 1 below:

TABLE 1

| No. | Carboxylic Acid | Gel Time 150° C (min) | Pot Life 25° C (days) | Electrical Properties 150° C | |
|---|---|---|---|---|---|
| | | | | 100 × tan δ | E' |
| 1 | none (control)* | 55–60 | 125+ | 3.0% | 6.4 |
| 2 | acetic acid | 40–45 | 125+ | 3.2% | 6.6 |
| 3 | butyric acid | 40–45 | 125+ | 3.0% | 6.3 |
| 4 | heptanoic acid | 40–45 | 125+ | 1.6% | 6.8 |
| 5 | benzoic acid | 40–45 | 125+ | 1.3% | 6.5 |
| 6 | lactic acid* | 30–40 | 30 | 2.0% | 6.2 |
| 7 | trifluoroacetic acid* | 40–45 | 3 | 60+% | — |
| 8 | benzene sulfonic acid* | 120–165 | ** | 15.0% | 7.4 |
| 9 | catechol* | 120–165 | 30 | 1.3% | 6.6 |

No. 2–8, grams chromium acetylacetonate:grams acid = 0.05:6
*comparative examples
**not determined due to insolubility in resin As can be seen, in a chromium acetylacetonate system, samples 2, 3, 4 and 5 show a dramatic improvement in gel time over the control sample, showing their effectiveness as a coaccelerator, without any deleterious effect on pot life or electrical properties. Samples 6 and 7, using hydroxy substituted and fluorinated carboxylic acids, while providing excellent gel times, both showed very poor pot lives, and trifluoroacetic acid showed very poor electrical properties. Sample 8 showed very poor gel and electrical properties and insolubility in the resin. Sample 9 showed poor gel and pot life properties.

Since it is essential that the pot life and electrical properties, as well as gel times be outstanding for high voltage coil impregnation resins, samples 6, 7 8 and 9 would not be useful in such applications.

EXAMPLE 2

Resin samples were made as in EXAMPLE 1, (50 grams of DER-332; 50 grams of DGENPG and 105 grams of 1-methyl tetrahydrophthalic anhydride), and tested using the same procedure as in EXAMPLE 1, except that 0.10 gram of chromium acetylacetonate was used, and from 0.05 gram to 20 grams of acetic acid was used. The weight ratio of epoxy resin:acid anhydride:-chromium acetylacetonate:acetic acid was 100:105:0 to 0.10:0 to 20. These samples were compared to a sample containing no chromium acetyl acetonate. The results of tests are shown below in TABLE 2:

TABLE 2

| No. | Grams Chromium Acetylacetonate | Grams Acetic Acid | Gel Time 150° C (min) |
|---|---|---|---|
| 20 | 0.10 | none (control) | 56 |
| 21 | 0.10 | 0.5 | 48 |
| 22 | 0.10 | 1.0 | 45 |
| 23 | 0.10 | 2.0 | 40 |
| 24 | 0.10 | 3.0 | 30 |
| 25 | 0.10 | 20.0 | 25 |
| 26 | 0.00 | 1.0 | 300 |

This data would indicate improved gel times when about 0.3 grams or more of the carboxylic acid is used. Sample 26 shows the necessity of having both the selected acetylacetonate and the selected carboxylic acid.

EXAMPLE 3

Resin samples were made as in EXAMPLE 1 (50 grams of DER-332; 50 grams of DGENPG and 105 grams of 1-methyl tetrahydrophthalic anhydride), and tested using the same procedure as in EXAMPLE 1, except that 0.10 gram of chromium acetylacetonate was used, and 1.5 grams of selected aromatic methyl, chlorine and nitro-substituted monocarboxylic acids, and selected aliphatic and aromatic dicarboxylic acids, useful in this invention were used. The weight ratio of epoxy resin:acid anhydride:chromium acetylacetonate:-selected carboxylic acid was 100:105:0.1:1.5. The results of tests are shown below in TABLE 3:

TABLE 3

| No. | Carboxylic Acid | Gel Time 150° C (min) | Pot Life 25° C (days) |
|---|---|---|---|
| 30 | none (control) | 55-65 | 125+ |
| 31 | para toluic | 40-50 | 125+ |
| 32 | para chlorobenzoic | 40-50 | 125+ |
| 33 | para nitrobenzoic | 40-50 | 125+ |
| 34 | succinic | 40-50 | 125+ |
| 35 | isophthalic | 40-50 | 125+ |

EXAMPLE 4

Resin samples were made as in EXAMPLE 1 (50 grams of DER-332; 50 grams of DGENPG and 105 grams of 1-methyl tetrahydrophthalic anhydride), and tested using the same procedure as in EXAMPLE 1, except that 0.10 part of zirconium acetylacetonate and 0.0 to 3.0 parts of acetic acid was used. The weight ratio of epoxy resin:acid anhydride: zirconium acetylacetonate:acetic acid was 100:105:0.10:0 to 3. The results of tests are shown below in TABLE 4:

TABLE 4

| No. | Grams Zirconium Acetylacetonate | Grams Acetic Acid | Gel Time 150° C (min) | Pot Life 25° C (days) |
|---|---|---|---|---|
| 40 | 0.10 | none (control) | 70-80 | 70 |
| 41 | 0.10 | 3.0 | 50-60 | 65 |

As can be seen, in a zirconium acetylacetonate system, addition of acetic acid shows a dramatic improvement in gel time over the control sample and has acceptable pot life properties.

EXAMPLE 5

As a comparative example, samples were made as in EXAMPLE 1 (50 grams of DER-332; 50 grams of DGENPG and 105 grams of 1-methyl tetrahydrophthalic anhydride), and tested using the same procedure as in EXAMPLE 1, except that 0 to 3.0 parts of acetic acid was used and 0.10 part of cobaltous ($Co^{+2}$) acetylacetonate; 0.10 part of cobaltic ($Co^{+3}$) acetylacetonate and 0.10 part of manganese ($Mn^{+3}$) acetylacetonate was used, instead of either chromium or zirconium acetylacetonate. The weight ratio of epoxy resin:acid anhydride: ($Co^{+2}$, $Co^{+3}$, or $Mn^{+3}$) acetylacetonate:acetic acid was 100:105:0.10:0 to 3. The results of tests are shown below in TABLE 5:

TABLE 5

| No. | Acetylacetonate | Grams Acetic Acid | Gel Time 150° C (min) |
|---|---|---|---|
| 50 | $Co^{+2}$ acetyl | none (control) | 150-180 |
| 51 | acetonate | 3.0 | 150-180 |
| 52 | $Co^{+3}$ acetyl | none (control) | 180-200 |
| 53 | acetonate | 3.0 | 180-200 |
| 54 | $Mn^{+3}$ acetyl | none (control) | 200-210 |
| 55 | acetonate | 3.0 | 200-210 |

As can be seen, in either a cobalt or manganese acetylacetonate system, addition of acetic acid shows no improvement in gel time over the control samples.

We claim:

1. A highly fluid, solventless, high voltage capability, resinous impregnating composition consisting essentially of the admixture of:
    (A) 100 parts by weight of a resin comprising:
        (1) a first epoxy resin consisting of a diglycidyl ether of an aliphatic diol; and
        (2) a second epoxy resin selected from the group consisting of bisphenol A epoxy resins, bisphenol F epoxy resins, novolac epoxy resins, glycidyl ester epoxy resins, hydantoin epoxy resins, cycloaliphatic epoxy resins and mixtures thereof, wherein the weight ratio of diglycidyl ether of an aliphatic diol:second epoxy resin is from about 1.0:0.0 to about 1.0:9.0,
    (B) about 25 parts to about 200 parts by weight of an organic carboxylic acid anhydride,
    (C) about 0.01 part to about 2.0 parts by weight of a metal acetylacetonate selected from the group consisting of chromium (III) acetylacetonate, zirconium (IV) acetylacetonate, and mixtures thereof, acting as a latent accelerator, and
    (D) about 0.3 to about 30 parts by weight of an organic carboxylic acid selected from the group consisting of acetic acid, propionic acid, butyric acid, isobutyric acid, valeric acid, caproic acid, heptanoic acid, caprylic acid, benzoic acid, toluic acids, chlorobenzoic acids, nitrobenzoic acids, succinic acid, glutaric acid, adipic acid, pimelic acid, suberic acid, azelaic acid, sebacic acid, phthalic acid, isophthalic acid, terephthalic acid and mixtures thereof, acting as sole co-accelerator, wherein the resinous composition is highly fluid, having an initial viscosity of below about 350 cps. at 25° C.

2. The composition of claim 1, wherein the epoxy resins of (A)(1) and (A)(2) have an epoxy equivalent weight of from about 100 to about 500.

3. The composition of claim 2, wherein the composition has a storage lifetime of at least 60 days under 1,000 cps. at 25° C..

4. The composition of claim 2, wherein the metal acetylacetonate is chromium (III) acetylacetonate, and the organic carboxylic acid is selected from the group consisting of acetic acid, butyric acid, heptanoic acid, benzoic acid, toluic acids, chlorobenzoic acids, nitrobenzoic acids, succinic acid, isophthalic acid and mixtures thereof.

5. The composition of claim 2, wherein the diglycidyl ether of an aliphatic diol has a viscosity of between about 5 cps. to about 60 cps. at 25° C. and the second epoxy resin has a viscosity of between about 250 cps. to about 20,000 cps. at 25° C..

6. The composition of claim 2, wherein the diglycidyl ether of an aliphatic diol is selected from the group consisting of diglycidyl ethers of neopentyl glycol, diglycidyl ethers of 1,4 butane diol, diglycidyl ethers of ethylene glycol, diglycidyl ethers of polyether glycols and mixtures thereof.

7. The composition of claim 2, wherein the organic carboxylic acid is acetic acid.

8. The composition of claim 2, wherein the composition also contains up to about 100 parts of filler particles, of average particle sizes of from about 10 microns to about 300 microns.

* * * * *